United States Patent
Zobel

(10) Patent No.: US 9,418,303 B2
(45) Date of Patent: Aug. 16, 2016

(54) METHOD FOR TRAFFIC SIGN RECOGNITION

(75) Inventor: Matthias Zobel, Wasserburg (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 638 days.

(21) Appl. No.: 13/388,095

(22) PCT Filed: Sep. 24, 2010

(86) PCT No.: PCT/DE2010/001123
§ 371 (c)(1),
(2), (4) Date: Jan. 31, 2012

(87) PCT Pub. No.: WO2011/038714
PCT Pub. Date: Apr. 7, 2011

(65) Prior Publication Data
US 2012/0128210 A1    May 24, 2012

(30) Foreign Application Priority Data
Oct. 1, 2009  (DE) .......................... 10 2009 048 066

(51) Int. Cl.
*G06K 9/00* (2006.01)
*G06K 9/42* (2006.01)

(52) U.S. Cl.
CPC .............. *G06K 9/00818* (2013.01); *G06K 9/42* (2013.01)

(58) Field of Classification Search
CPC .................. G06T 2207/10016; G06T 7/2033; G06K 9/3241
USPC ............... 345/522; 375/240.24; 382/103, 104
See application file for complete search history.

(56) References Cited

U.S. PATENT DOCUMENTS

| 4,566,124 A | 1/1986 | Yamamoto et al. |
| 4,901,362 A | 2/1990 | Terzian |
| 5,594,806 A | 1/1997 | Colbert |
| 6,208,758 B1 * | 3/2001 | Ono .................... G06K 9/00268 382/157 |
| 6,690,842 B1 | 2/2004 | Silver et al. |

(Continued)

FOREIGN PATENT DOCUMENTS

| DE | 199 38 256 | 2/2001 |
| DE | 198 52 631 | 5/2005 |

(Continued)

OTHER PUBLICATIONS

Ishida H., et al., "Identification of degraded traffic sign symbols by a generative learning method," Proceedings of the 18th International Conference on Pattern Recognition (ICPR'06), 2006.*

(Continued)

Primary Examiner — Vikkram Bali
Assistant Examiner — Xuemei Chen
(74) Attorney, Agent, or Firm — W. F. Fasse

(57) ABSTRACT

A traffic sign recognition method analyzes and classifies image data of a sensor in an information processing unit. The image data is analyzed to select an image portion judged to contain a traffic sign of a particular sign class. A class-specific feature is identified in the image portion. A modified image portion is created, in which the class-specific feature has been shifted to a center of the modified image portion. Then the modified image portion is evaluated by a learning-based algorithm to recognize the traffic sign of the particular sign class.

18 Claims, 2 Drawing Sheets

(56) References Cited

U.S. PATENT DOCUMENTS

| | | | |
|---|---|---|---|
| 6,801,638 B1 | 10/2004 | Janssen et al. | |
| 6,842,177 B2 * | 1/2005 | Garg et al. | 345/441 |
| 6,888,892 B2 * | 5/2005 | Chung et al. | 375/240.24 |
| 7,034,848 B2 * | 4/2006 | Sobol | H04N 1/2104 345/619 |
| 7,058,206 B1 | 6/2006 | Janssen et al. | |
| 7,209,141 B2 * | 4/2007 | Garg et al. | 345/522 |
| 7,466,841 B2 | 12/2008 | Bahlmann et al. | |
| 8,064,643 B2 * | 11/2011 | Stein et al. | 382/104 |
| 8,170,340 B2 | 5/2012 | Klefenz | |
| 8,233,670 B2 * | 7/2012 | Moed | G06K 9/00818 382/100 |
| 8,340,420 B2 * | 12/2012 | Smith et al. | 382/170 |
| 8,346,706 B2 | 1/2013 | Groitzsch et al. | |
| 8,370,755 B2 * | 2/2013 | Buecker et al. | 715/751 |
| 8,379,014 B2 * | 2/2013 | Wiedemann | G06K 9/00201 345/419 |
| 8,391,612 B2 * | 3/2013 | Natroshvili | G06T 7/0085 382/103 |
| 8,396,295 B2 * | 3/2013 | Gao | G06K 9/00416 382/187 |
| 8,452,524 B2 | 5/2013 | Groitzsch et al. | |
| 8,953,842 B2 * | 2/2015 | Zobel | G06K 9/00818 382/103 |
| 9,160,993 B1 * | 10/2015 | Lish | H04N 5/23229 |
| 2003/0059088 A1 | 3/2003 | Culp et al. | |
| 2003/0202683 A1 | 10/2003 | Ma et al. | |
| 2005/0086051 A1 | 4/2005 | Brulle-Drews | |
| 2005/0111698 A1 | 5/2005 | Kawai | |
| 2005/0232469 A1 | 10/2005 | Schofield et al. | |
| 2006/0098877 A1 | 5/2006 | Barnes et al. | |
| 2007/0081739 A1 * | 4/2007 | Wilbrink | G09G 3/20 382/275 |
| 2008/0107345 A1 | 5/2008 | Melikian | |
| 2008/0137908 A1 | 6/2008 | Stein et al. | |
| 2008/0199050 A1 | 8/2008 | Koitabashi | |
| 2009/0074249 A1 | 3/2009 | Moed et al. | |
| 2010/0198488 A1 | 8/2010 | Groitzsch et al. | |
| 2010/0328316 A1 | 12/2010 | Stroila et al. | |
| 2013/0011016 A1 | 1/2013 | Haas et al. | |
| 2013/0058534 A1 | 3/2013 | Zobel | |
| 2014/0119605 A1 | 5/2014 | Zobel | |

FOREIGN PATENT DOCUMENTS

| | | |
|---|---|---|
| DE | 102005017541 | 10/2006 |
| DE | 102005062154 | 7/2007 |
| DE | 102006053289 | 5/2008 |
| DE | 102006059663 | 6/2008 |
| DE | 102008057675 | 7/2009 |
| EP | 0 149 457 | 7/1985 |
| EP | 1 508 889 | 2/2005 |
| EP | 2 026 313 | 2/2009 |
| EP | 2 048 597 | 4/2009 |
| WO | WO 91/17518 | 11/1991 |

OTHER PUBLICATIONS

Wang, Yongping et al., National University of Defense Technology, ChangSha, China, "A Method of Fast and Robust for Traffic Sign Recognition", Fifth International Conference on Image and Graphics, Sep. 20, 2009, IEEE, NJ, USA, XP031652742, pp. 891 to 895.

Priese, Lutz et al., University of Koblenz-Landau, Koblenz, Germany, "Ideogram Identification in a Realtime Traffic Sign Recognition System", Intelligent Vehicles '95 Symposium, Sep. 25, 1995, Michigan, USA; IEEE, NY, USA, XP010194135, pp. 310 to 314.

Hoessler, Helene et al., "Classifier Training Based on Synthetically Generated Samples", 5$^{th}$ International Conference on Computer Vision Systems, Mar. 21, 2007, Applied Computer Science Group, Bielefeld University, Germany, XP002510914, pp. 1 to 10.

International Search Report of the International Searching Authority for International Application PCT/DE2010/001123, mailed Jan. 13, 2011, 3 pages, European Patent Office, HV Rijswijk, Netherlands.

PCT International Preliminary Report on Patentability, including English Translation of PCT Written Opinion of the International Searching Authority for International Application PCT/DE2010/001123, issued Apr. 11, 2012, 9 pages, International Bureau of WIPO, Geneva, Switzerland.

German Search Report for German Application No. 10 2009 048 066.8, dated Oct. 12, 2010, 3 pages, Muenchen, Germany, with English translation, 3 pages.

X. W. Gao et al., "Recognition of traffic signs based on their colour and shape features extracted using human vision models", Journal of Visual Communication and Image Representation, vol. 17, Issue 4, Aug. 2006, pp. 675 to 685.

English translation of DE 10 2008 057 675 A1.

* cited by examiner

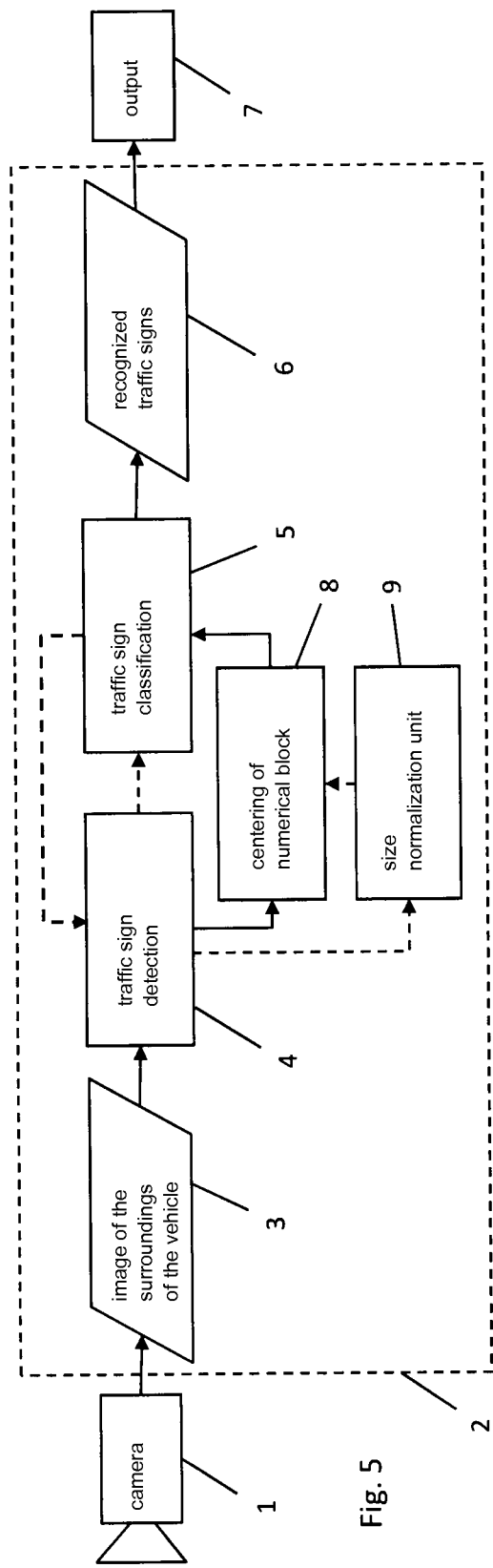
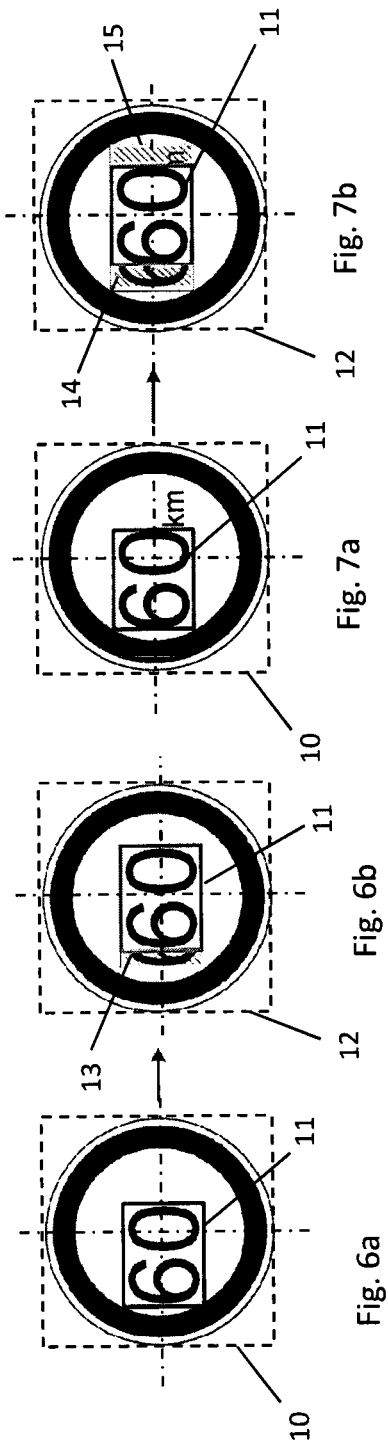

METHOD FOR TRAFFIC SIGN RECOGNITION

FIELD OF THE INVENTION

The invention relates to a method for traffic sign recognition by analyzing and classifying image data.

BACKGROUND INFORMATION

Modern driver assistance systems are being increasingly equipped with an electronic traffic sign recognition system in order to, e.g., warn the driver in the event of speeding. For this purpose, a camera records images of the region in front of the vehicle and delivers corresponding image data to an onboard computer that analyzes and classifies the image data by means of an algorithm in order to identify a traffic sign therefrom.

Such a method is known from, e.g., DE 198 52 631 A1.

The aim of such methods for traffic sign recognition consists in minimizing the rejection rate, i.e., the share of signs that are not recognized or recognized wrongly, wherein it would be advantageous if all traffic signs were standardized with respect to their design, whereby the great variety of different traffic signs, particularly in road traffic in foreign countries, would be reduced. Therefore, several European countries partially agreed on a standardization of traffic signs (Vienna Convention on Road Signs and Signals), e.g., on a characteristic design of speed limit signs (circular sign having a red outer ring and a number indicating the speed limit).

In a detection phase of such methods for traffic sign recognition, image regions that may contain potential traffic signs are identified in the camera image. After that, in a second procedure step, these sign hypotheses are submitted to a classificator that decides whether a traffic sign is present in the image region and which traffic sign it is.

The schematic block diagram in FIG. 1 shows a computer-based traffic sign recognition system that operates according to such a method. According to this, a camera 1 records images of the surroundings and the corresponding image data are stored in a storage unit 3 of an information processing unit 2 that additionally comprises a detection unit 4, a classification unit 5, an output storage 6, and an output unit 7. In the detection unit 4, those image regions (sign hypotheses) are identified which are subsequently submitted to the classification unit 5. The recognized traffic signs are stored in the output storage 6 and are then available to the output unit 7 (e.g., to a central display or to a display of an instrument cluster) for indication to the driver.

The classificator or classification unit 5 may operate in a learning-based manner (known from, e.g., DE 10 2005 062 154 A1), i.e., it is appropriately trained in advance using a set of learning examples whose specific designs depend on the selected detection method. For example, a known method for speed limit recognition consists in searching for circles in the camera image by means of image processing phases during the detection phase and submitting the surrounding rectangle as an image detail to the classificator, wherein this feature "circles" defines a particular class of traffic signs.

A method for the recognition of circular objects in image data of an image sensor is known from, e.g., DE 10 2005 017 541 A1.

As explained above, most countries use speed limit signs that are standardized according to the Vienna Convention and are characterized in that only a centered numerical block indicating the speed limit is embedded in the traffic sign (see FIG. 2). This is the usual design of a speed limit sign.

In addition to these standardized speed limit signs, however, there are signs, e.g., in Austria or Belgium, whose designs differ from the standardized one. In these different signs, a smaller text (e.g., "km") is supplemented to the relevant numerical block (see FIG. 3) or the relevant numerical block is not centered (see FIG. 4), which often results in the size of the numerical block differing from the standardized design shown in FIG. 2, too. In most cases, it is smaller than the standard size. Sometimes, a traffic sign according to FIG. 4 is also created by sticking something over or painting over a text supplement existing on the traffic sign.

Concerning a classificator that operates in a learning-based manner, these deviations from the usual design of a speed limit sign (centered numerical block on the traffic sign) will result in highly increased variability since learning or training examples must be generated and provided also for these variations. Furthermore, more sign hypotheses will pass through such a classificator on account of said increased variability so that there will be the risk of an increased false alarm rate (false positives).

SUMMARY OF THE INVENTION

It is therefore an object of one or more embodiments of the invention to provide a method for traffic sign recognition of the type mentioned above in which the number of necessary variations of learning and training examples for the classificator is limited without decreasing the recognition rate or endangering the real-time requirements.

The above object can be achieved according to the invention in an embodiment of a method in which the image data of a sensor are analyzed and classified in an information processing unit, wherein at least one image detail that sufficiently probably contains an object that is a traffic sign belonging to a particular class of traffic signs is determined on the basis of the results of an analysis in a first procedure step, and this image detail is submitted, in a second procedure step, to a classificator or classifier that recognizes a traffic sign belonging to the particular class on the basis of the selected image detail by means of a learning-based algorithm, and the method further involves identifying a class-specific feature in the image detail in the first procedure step, generating a modified image detail with the class-specific feature in the image center thereof, wherein the image regions created by shifting the class-specific feature to the image center are padded with suitable pixels, and submitting the modified image detail to the classificator.

If a class-specific feature of a particular class of traffic signs, e.g., of the class of circular speed limit signs, deviates from the unified standard, i.e., if, e.g., the numerical block is not centered on such speed limit signs, the image detail is modified in such a manner that the class-specific feature, i.e., this numerical block, is shifted to the image center of the image detail, said modification being performed prior to submitting the image detail to the classificator. The classificator performs classification on the basis of this modified image detail. Thus, the training of the classificator can be reduced to traffic signs that have the class-specific feature in the center of the submitted image detail, whereby the variation of the learning examples that are necessary for the training of the classificator is reduced so that the number of training examples to be provided can be reduced, too.

Because of this limitation, i.e., since the classificator must only classify class-specific features that are positioned in the center of the image detail to be processed so that the number of training examples is also reduced, it is possible to develop a robust classification method.

In a particularly advantageous further development of the invention, the modified image detail is generated by inserting the class-specific feature into the representation of a traffic sign of the particular class of traffic signs, said traffic sign being stored in a database. This means that instead of the real image detail, an artificial traffic sign of the particular class that does not have the class-specific feature and is stored in a database is used and inserted into the class-specific feature to be classified. After that, the modified image detail generated in this manner is submitted to the classificator for classification. This is another possibility of advantageously reducing the variability of the training examples, said reduction resulting in an increased recognition rate.

According to an advantageous further development of the invention it is not only possible to normalize the position of the class-specific feature. It is also possible to normalize the size by setting the class-specific feature to a predetermined image size in the modified image detail, thereby making a further reduction of the number of classificator training examples to be provided possible, whereby the robustness of the classification method can be additionally improved.

In a preferred further development of the invention, the position and/or the size are/is only normalized if the image detail to be processed has a particular size, thereby making it possible to prevent objects having a structure similar to the class-specific feature from being identified as potential traffic signs or to sort objects out that are too far from the vehicle or are assigned to an adjacent traffic lane.

Advantageously, in another further development of the inventive method, a modified image detail is only generated if at least one classification of the image data, preferably a predetermined number of image cycles, is unsuccessful. This results in an advantageous behavior of the classification method with respect to the real-time requirements on the recognition method.

Padding the image regions created by shifting the class-specific feature to the image center with pixels corresponding to the pixels of the surroundings of the class-specific feature is particularly advantageous with respect to the classification method. This results in an increased recognition rate. Preferably, these image regions may also be padded with pixels of a particular color, with pixels calculated from the pixels of the surroundings of the modified image detail, e.g., as a mean value with respect to a mean brightness or as a constant color, e.g., the background color of the traffic sign, the aim thereof being to achieve a representation for the classificator that corresponds to the training examples.

Particularly advantageously, the inventive method can be applied to a class of circular traffic signs and within this class of traffic signs to traffic signs with a numerical block, e.g., speed limit signs.

BRIEF DESCRIPTION OF THE DRAWINGS

In the following, the invention will be explained in greater detail with reference to the drawings in which

FIG. 5 shows a schematic block diagram of a circuit arrangement for explaining the inventive traffic sign recognition method;

FIGS. 6a and 6b show representations of a traffic sign for explaining the inventive traffic sign recognition method; and FIGS. 7a and 7b show further representations of a traffic sign for explaining the inventive traffic sign recognition method.

DETAILED DESCRIPTION OF EXAMPLE EMBODIMENTS OF THE INVENTION

Figure 1:
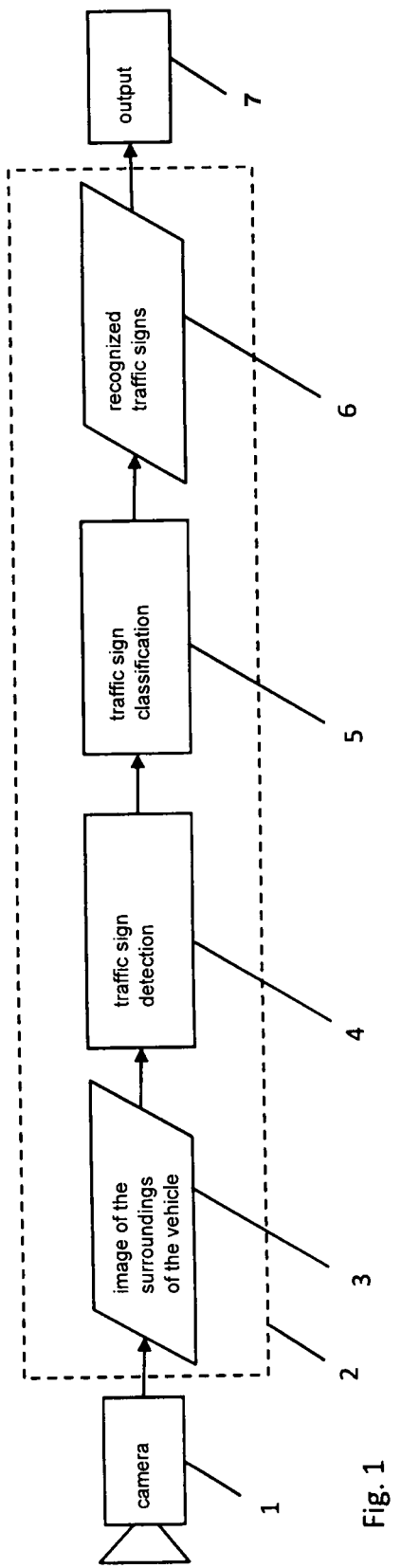
FIG. 1 shows a schematic block diagram of a circuit arrangement for explaining a known traffic sign recognition method.

The structure of the block diagram of a circuit arrangement according to FIG. 5 corresponds to the structure according to FIG. 1. As against this circuit arrangement according to FIG. 1, the circuit arrangement according to FIG. 5 has, according to the invention, a centering unit 8 in addition to the camera 1, the storage unit 3, the detection unit 4, the classification unit 5, the output storage 6 and the output unit 7, wherein the centering unit 8 may be supplemented with a size normalization unit 9.

The image data of image cycles recorded by the camera 1 are stored in the storage unit 3 and submitted to the detection unit 4 for the detection of relevant image details. Relevant image details are image data that sufficiently probably contain a traffic sign that belongs to a particular class, e.g., a circular traffic sign. Furthermore, a class-specific feature is detected for this particular class of traffic signs, said feature being, e.g., a numerical block of a speed limit sign.

FIG. 6a shows such a relevant image detail 10 that contains a circular traffic sign with a numerical block 11 as a class-specific feature, wherein this numerical block 11 indicates a speed limit of "60". The reticule in FIG. 6a shows that this numerical block 11 is not centered in the image detail 10.

In the next procedure step, this image detail 10 according to FIG. 6a is supplied to the centering unit 8 that generates a modified image detail 12 (see FIG. 6b) from this image detail 10, wherein the numerical block 11 is generated in the center of the image detail 10 so that a modified image detail 12 according to FIG. 6b is created, wherein the reticule in FIG. 6b clearly shows that the numerical block 11 is centered. By generating or shifting the numerical block 11 to the center of the image detail 12, an image region 13 of the original position of the numerical block 11 is created, said image region 13 showing a part of the structure of the digit "6" of the numerical block 11. This image region 13 is replaced or overwritten with suitable pixels. For example, this image region 13 may be replaced with pixels corresponding to the pixels of the surroundings of the numerical block 11 or with pixels of a particular color or with pixels corresponding to the mean value of the pixels of the modified image detail 12. The image region 13 may also be padded with pixels corresponding to the background of the image detail 10.

Figures 2, 3A, 3B, 4:
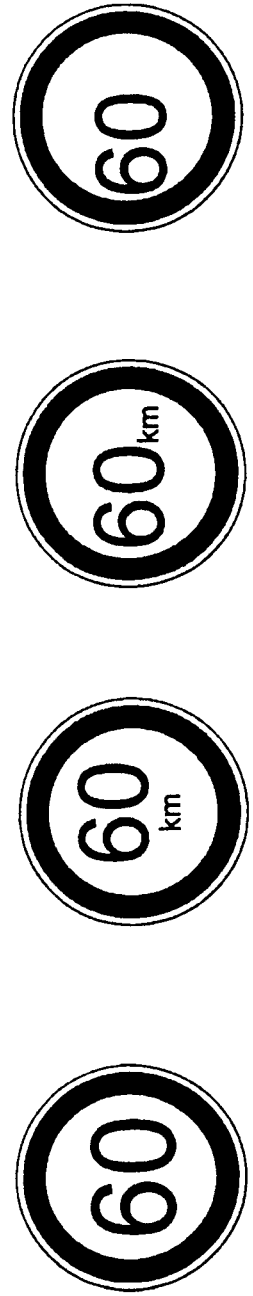
FIG. 2 shows a representation of a speed limit sign standardized according to the Vienna Convention.
FIGS. 3a and 3b show representations of traffic signs deviating from the design according to the traffic sign of FIG. 2.
FIG. 4 shows a further representation of a traffic sign having a design that deviates from the design according to the traffic sign of FIG. 2.

Thus, the image generated by means of the modified image detail 12 corresponds to the standardized traffic sign according to FIG. 2.

The modified image detail 12 is now submitted to the classification unit 5 that identifies the traffic sign according to FIG. 2 (speed limit of "60") from the image detail 12 and stores it in the output storage 6 wherefrom it can be indicated to the driver, e.g., on the instrument cluster of the driver's vehicle as the current speed limit.

A further example for the recognition of a traffic sign by means of the inventive method will be explained on the basis of FIGS. 7a and 7b. In this example, an image detail 10 is detected according to FIG. 7a. In the image detail 10, the numerical block 11 (class-specific feature) is supplemented with the text "km". In this image detail 10, the numerical block 11 is not centered, either (see reticule).

Prior to classifying this image detail 10, this numerical block 11 is centered in the image detail 10 by means of the centering unit 8 (as explained above in connection with the description of FIG. 6) so that a modified image detail 12 according to FIG. 7b is created.

Furthermore, when generating this modified image detail 12 with the centered numerical block 11, image regions 14 and 15 of the original position of the numerical block 11 in the image detail 10 are created that show a part of the structure of the digit "6" of the numerical block 11 or a part of the structure of the supplement "km". As described in the previous example in connection with FIG. 6b, these image regions 14 and 15 are replaced or overwritten with suitable pixels so that the classification unit 5 can identify a traffic sign on the basis of a modified image detail 12, said traffic sign corresponding to the standardized design of a traffic sign according to FIG. 2.

The modified image detail 12 may also be generated by using artificial traffic signs of the particular class that are stored in a memory of the detection unit 4, said artificial traffic signs not having the class-specific feature. A representation of such a traffic sign corresponds to a circular traffic sign with a red edge (see FIG. 2), but without the numerical block indicating the speed limit of "60". The numerical block 11 detected from the real image detail 10 by the detection unit 4 is inserted into such an artificial traffic sign and supplied as a modified image detail 12 to the classification unit 5.

In addition to the normalization of the position of a numerical block 11 in an image detail 10, the size of the recognized numerical block 11 may be normalized. The size is normalized by means of a size normalization unit 9 that is shown as an additional component in the circuit arrangement according to FIG. 5. In a first step, an image detail 10 is supplied to the size normalization unit 9 in order to change the size of the numerical block 11 recognized in the image detail 10 into a predetermined size, i.e., to normalize it. In a second step, the image detail modified in this manner is supplied to the centering unit 8 in order to generate a further modified image detail 12 according to FIG. 6b or 7b with a centered numerical block 11 from the image detail modified by the size normalization unit 9.

The inventive traffic sign recognition method may also be modified in such a manner that particular conditions concerning the image detail 10 must be met prior to centering and/or size normalization.

For example, the classification unit 5 may classify the image detail 10 at first, i.e., the image detail 10 generated in the detection unit 4 may be submitted to the classification unit 5 at first, and only if a successful classification cannot be performed after a particular number of image cycles, this image detail 10 is returned to the detection unit 4 and then supplied to the centering unit 8 or to the size normalization unit 9.

Furthermore, such a condition may be that image details 10 must have a particular size so that objects that are too far from the vehicle or do not represent a traffic sign or are traffic signs of adjacent traffic lanes are sorted out.

REFERENCE NUMERALS 1 camera
2 information processing unit
3 storage unit for image data
4 detection unit
5 classification unit
6 output storage
7 output unit
8 centering unit
9 size normalization unit
10 image detail
11 class-specific feature, numerical block
12 modified image detail
13 image region
14 image region
15 image region

The invention claimed is:

1. A method of traffic sign recognition that analyzes and classifies image data provided by a sensor in an information processing unit, wherein
   an initial image detail that sufficiently probably contains an image of an entire actual traffic sign belonging to a particular class of traffic signs is determined from results of an analysis of the image data,
   a class-specific feature of the entire actual traffic sign is identified in the initial image detail at a location away from a geometric center of the entire actual traffic sign relative to an outer border of the entire actual traffic sign that extends around an outer perimeter of the entire actual traffic sign,
   the initial image detail is modified by shifting the class-specific feature so as to thereby produce a modified image detail that contains an image of an entire modified traffic sign, which corresponds to the image of the entire actual traffic sign except that the class-specific feature has been shifted to a geometric center of the entire modified traffic sign relative to the outer border thereof in the modified image detail and thereby replaces what is at the geometric center of the entire actual traffic sign in the initial image detail, and except that at least one adjacent image region is padded with filler pixels, wherein the at least one adjacent image region is adjacent to the class-specific feature in the entire modified traffic sign in the modified image detail, and
   the modified image detail is submitted to a classificator which evaluates the image of the entire modified traffic sign with the class-specific feature at the geometric center of the entire modified traffic sign in the modified image detail by a learning-based algorithm to recognize the entire modified traffic sign.

2. The method according to claim 1, characterized in that the class-specific feature is further adjusted to a predetermined image size in the modified image detail.

3. The method according to claim 1, characterized in that the initial image detail is additionally evaluated as to a size thereof, and the modified image detail is produced only if the initial image detail has a predetermined size.

4. The method according to claim 1, characterized in that the initial image detail is submitted to the classificator which attempts to recognize the entire actual traffic sign from the initial image detail, and the modified image detail is produced only if the attempt to recognize the entire actual traffic sign from the initial image detail is unsuccessful.

5. The method according to claim 1, characterized in that the filler pixels correspond to other pixels of surroundings of the class-specific feature.

6. The method according to claim 1, characterized in that the filler pixels are calculated from other pixels of surroundings of the class-specific feature.

7. The method according to claim 1, characterized in that the particular class of traffic signs comprises circular traffic signs, and the entire actual traffic sign is a circular traffic sign of which the outer border comprises a contrasting circular border line around the outer perimeter thereof.

8. The method according to claim 1, characterized in that the particular class of traffic signs comprises traffic signs with a numerical block as the class-specific feature.

9. A method of traffic sign recognition, comprising steps:
   a) providing image data from an image sensor;
   b) in an information processing arrangement, analyzing the image data and selecting an initial image portion thereof that includes an image of an entire actual traffic sign that is bounded by an outer border that extends around an outer perimeter of the entire actual traffic sign;
   c) in the information processing arrangement, evaluating the image of the entire actual traffic sign and therein identifying an informational block of the entire actual traffic sign at a geometrically uncentered position relative to the outer border;
   d) in the information processing arrangement, shifting a position of the informational block to a geometric center relative to the outer border within the image of the entire actual traffic sign to produce therefrom a modified image portion containing an image of an entire modified traffic sign in which the informational block is positioned at the geometric center of the entire modified traffic sign in the modified image portion; and
   e) in the information processing arrangement, evaluating the image of the entire modified traffic sign in the modified image portion to recognize the entire modified traffic sign including the informational block at the geometric center thereof as only a portion thereof.

10. The method according to claim 9, wherein the outer border comprises an outer peripheral portion of the entire actual traffic sign in the image of the entire actual traffic sign.

11. The method according to claim 9, wherein the entire actual traffic sign includes a background field on which the informational block is disposed, and wherein the outer border comprises a contrasting border line extending around the background field.

12. The method according to claim 9, wherein the informational block is a numerical block that contains only numbers.

13. The method according to claim 9, wherein the shifting of the position of the informational block in the step d) creates an area that had been occupied by the informational block in the initial image portion and that is adjacent to the informational block in the modified image portion, and further comprising filling the area with filler pixels determined from a background field of the entire actual traffic sign on which the informational block is disposed.

14. The method according to claim 13, further comprising overwriting with additional filler pixels an additional area that is located adjacent to the informational block in the modified image portion and that contains informational symbols other than and smaller than the informational block.

15. The method according to claim 9, wherein the shifting of the position of the informational block comprises copying or shifting pixels of the informational block.

16. The method according to claim 9, wherein the evaluating of the image of the entire modified traffic sign in the modified image portion to recognize the entire modified traffic sign is performed according to a learning-based algorithm.

17. A method of traffic sign recognition, comprising steps:
   a) with an image sensor, capturing an initial image of an entire actual traffic sign that is bounded around an outer perimeter thereof by an outer border of the entire actual traffic sign, and that includes a sign background, and an information block at a geometrically uncentered position relative to the outer border;
   b) in an information processing arrangement, analyzing the initial image to detect the entire actual traffic sign and the information block;
   c) in the information processing arrangement, producing a copy of the information block and overwriting the copy of the information block onto the initial image of the entire actual traffic sign at a geometrically centered position relative to the outer border so as to thereby produce a modified image of an entire modified traffic sign that includes the outer border, the sign background, and the copy of the information block except at least that the copy of the information block in the modified image is at the geometrically centered position relative to the outer border of the entire modified traffic sign;
   d) in the information processing arrangement, evaluating the entire modified traffic sign in the modified image to recognize the entire modified traffic sign; and
   e) outputting an output dependent on and indicative of the recognized entire modified traffic sign.

18. The method according to claim 17, wherein the outer border comprises a contrasting border line extending around the sign background.

* * * * *